United States Patent Office 3,069,913
Patented Dec. 25, 1962

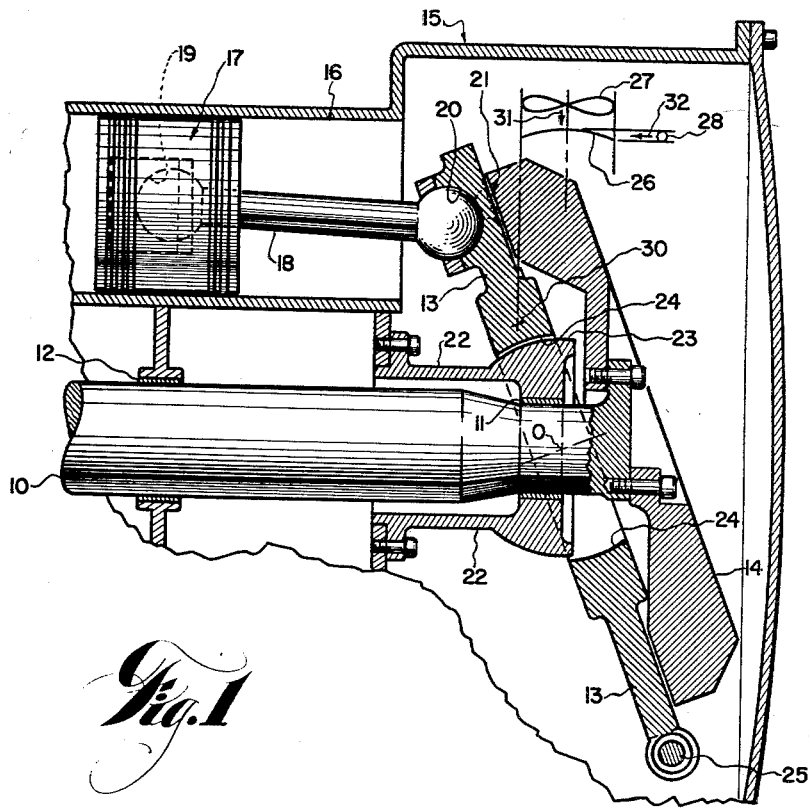

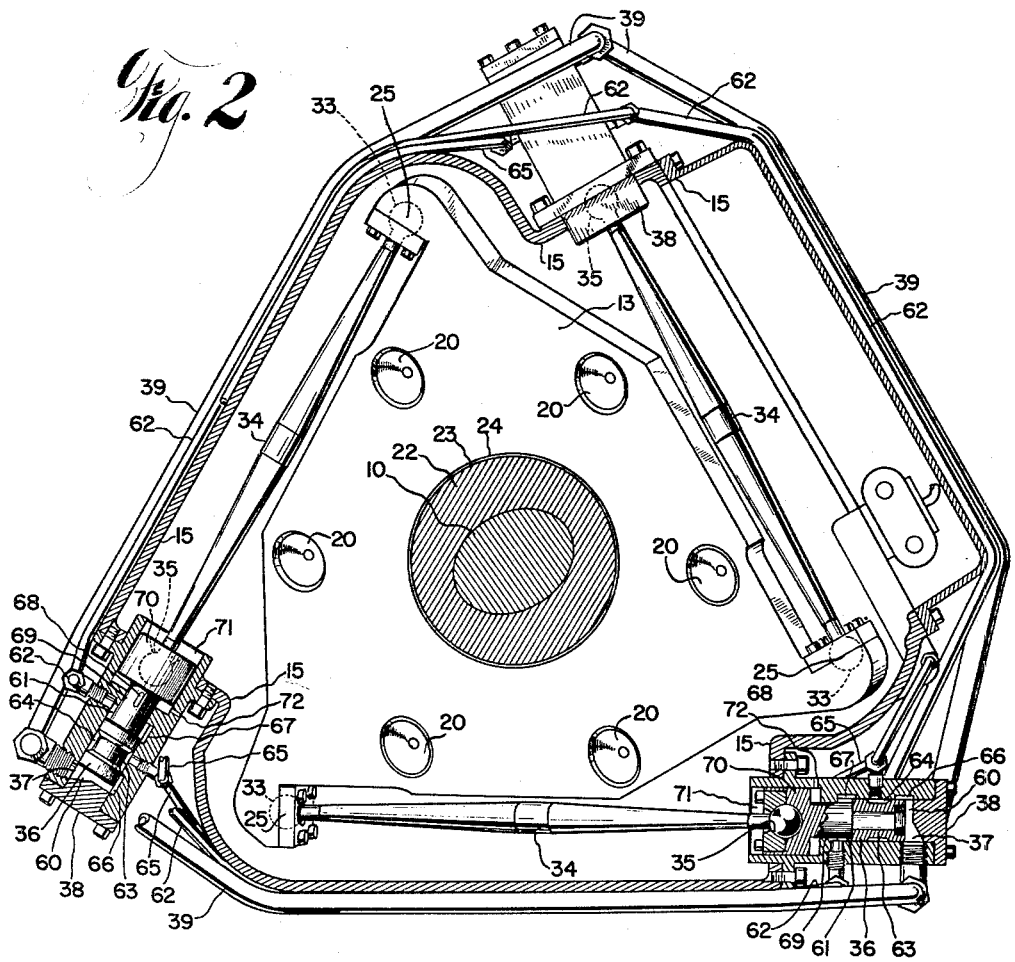

3,069,913
CRANKLESS MOTION MECHANISM
Rollin J. McCrory, Worthington, and Alfred W. Carey, Jr., and Joseph H. McNinch, Jr., Columbus, Ohio, assignors, by mesne assignments, to The Battelle Development Corporation, Columbus, Ohio, a corporation of Delaware
Filed May 11, 1960, Ser. No. 28,270
2 Claims. (Cl. 74—60)

This invention relates to a crankless motion mechanism for conversion between reciprocating motion and rotary motion about an axis.

In crankless motion conversion mechanisms, reciprocating motion is converted into rotary motion, or vice versa, by a rotative slant also known as a swash plate. The conversion from one form of motion to the other may be accomplished through a nonrotative, oscillating member known as a cage to which the reciprocating members are connected. The cage is in slidable engagement with the slant, which is fixedly attached to a shaft. The slidable engagement between the cage and the slant causes the slant and its attached shaft to rotate as the cage reciprocates.

Where the reciprocating motion applied to the cage produces a torque on the slant to rotate the shaft, as in a slant engine, the reaction between the slant and the cage produces a torque on the cage that tends to rotate it in the opposite direction from the rotation of the shaft. It is therefore necessary to restrain the cage to prevent its rotation and yet allow it to react against the slant. Such restraint is also required where the rotation of the slant is used to produce reciprocating motion in the cage.

It has been found that a small amount of angular motion in the cage about the axis of rotation of the shaft is necessary for efficient operation. In fact, there is an optimum path for such motion of any point on the cage. Any departure from the optimum path can produce high inertia loads, causing undue wear and possible damage to the mechanism. It is important therefore to control the cage so as to permit the optimum motion while preventing any angular motion of the cage as a whole. This invention provides improved apparatus for providing such control of the angular position of the cage.

The invention is particularly suited for the crankless motion mechanism of U.S. Patent 2,475,295; but it is not limited thereto. It may be used for angular control in other mechanisms for the conversion of reciprocating motion into rotary motion, or vice versa, such as those in which the slant or swash plate is not fixedly attached to the shaft of rotation but is rotatably mounted on an eccentrically positioned shaft at an angle to the shaft of rotation or in which the slant or swash plate is coupled to the shaft of rotation in any other suitable manner. Crankless motion conversion mechanisms have been utilized in combustion engines, blowing and pumping units, and other well-known apparatus, some of the means that have been used for angular control of cage members of crankless motion conversion mechanisms have been extensions of the nonrotative, oscillating member or cage meshing with cam guides on the mount, or with guides attached to the block or casing. Many such devices occupy excessive space, have small load-carrying capacity, have high frictional losses or incur serious wear, require special lubrication devices or manual adjustment and frequent maintenance and repair, and in many applications are not as efficient or as practical as this invention.

The present invention provides, in a crankless motion mechanism for conversion between reciprocating motion and rotary motion about an axis, by a rotative slant in slidable engagement with a cage, apparatus for controlling the angular position of the cage about the axis, comprising: three position restraining means; each position restraining means controlling the position of a different reference point on the cage; the reference points being angularly spaced at fixed locations on the cage about the axis substantially at an angle between each reference point and the angularly nearest other reference point of 120 degrees; the position restraining means so restraining the angular displacements of the reference points from their respective positions at a given position of the cage that the algebraic sum of the angular displacements from the respective positions at any instant is zero. In typical forms of the invention each position restraining means comprises a piston connected to a said reference point on the cage, the piston being slidable in a direction substantially perpendicular to the axis in a chamber at a fixed position in the mechanism, substantially incompressible fluid pressing against the piston at one end thereof in the chamber; means interconnecting the fluid in the chambers at said one end of each piston within a confined region, similar substantially incompressible fluid supplied under pressure to a region in each chamber normally between the ends of the piston, and means in each chamber for communicating the last-mentioned region with the one end of the chamber adjacent said one end of the piston when said one end of the piston moves within a predetermined distance from the adjacent one end of the chamber, to supply a portion of the fluid from the last-mentioned region to said one end of the chamber and thus tend to press said one end of the piston away from said adjacent one end of the chamber.

In the drawings:

FIG. 1 is a sectional elevation of a crankless motion mechanism embodying the present invention;

FIG. 2 is a normal view, partly in section, of the cage of FIG. 1 and associated apparatus embodying the invention;

FIG. 1 shows a portion of a crankless motion mechanism comprising a main shaft 10 rotatably mounted in suitable bearings 11 and 12. The bearing 11 is located substantially in the plane of the center of nutation O of a cage 13 mounted facing a slant or swash plate 14 secured to the shaft 10. The bearing 12 is affixed to a portion of a casing 15. The shaft 10 may be further mounted in additional suitable bearings, not shown, affixed to the casing 15.

The block or casing 15 is provided with a plurality of cylinders, generally designated 16, substantially parallel to the shaft 10 and uniformly disposed in a circle about the shaft 10. The cage 13 receives the reciprocating motion of a plurality of pistons, generally designated 17, which reciprocate in the cylinders 16. A piston rod 18 is connected at one end to a piston 17 and at the other end to the cage 13 through spherical socket bearings 19 and 20, respectively. Bearing elements, generally designated 21, which are attached to the cage 13, slidably engage the slant 14.

A mount 22 secured to the casing 15, holds the bearing 11 and encircles the shaft 10. The mount 22 has an outer bearing surface 23 comprising a portion of the surface of a sphere about the center O. The inner bearing surface 24 of the cage 13 is similarly shaped and thus forms a universal joint with the mount 22. At three reference points 25, only one of which is shown in FIG. 1, position restraining means are provided. The reference points 25 preferably are located equidistant from the axis of rotary motion. The restraining means are angularly spaced about the axis substantially at an angle between each reference point 25 and the nearest other reference point 25 of 120 degrees. The position restraining means so restrain the angular displacements of the reference points 25 from their respective positions at a given position of the cage that the algebraic sum of the angular displacements from the respective positions at any instant is zero. It has been found as an important part of this invention that such restraint causes the cage 13 to move in the optimum path for efficient operation with lowest inertia loads and least wear.

The optimum path for movement of any point on the cage 13 has the shape shown in the curves 26, 27, and 28 in FIG. 1. For convenience these curves are drawn with reference to a point 30 as indicated in FIG. 1. The curve 26 shows the locus of points over which the point 30 travels as viewed normal to the cross section of the cage 13 as shown in FIG. 1. Of course, the curve is displaced upward to avoid overlapping the mechanical components shown in FIG. 1. The curve 27 is a top view, as is indicated by the arrow 31, of the locus of the movement of the point 30, and the curve 28 is an end view, as is indicated by the arrow 32, of the same locus. The locus of movement is substantially in the shape of a lemniscate. All points on the cage 13 move in paths having this same shape, although, of course, points farther from the center O, such as the reference points 25, move in larger lemniscate-shaped paths.

In the operation of the crankless motion mechanism as illustrated, the pistons 17 reciprocate in the cylinders 16 of the casing 15 and cause nutating motion of the cage 13 by means of the piston rods 18 and the spherical socket bearings 19 and 20. The nutating motion of the cage 13 is converted to rotary motion of the slant 14 by the slidable engagement of the bearing elements 21 of the cage 13 with the slant 14. The slant 14, being secured to the main shaft 10, rotates, and thus causes the main shaft 10 to rotate in the bearings 11, 12. Power take-offs may be attached to the main shaft 10.

The piston load conveyed by the rods 18 is transmitted through the socket bearings 20, through the non-rotative, nutating member or cage 13, and from there through the bearing elements 21 to the slant 14, thereby causing rotation of the slant 14. The inward or radial reaction from the bearing elements 21 is transferred through the cage 13 to the outer bearing surface 23 of the mount 22. The tangential or torque reaction is transferred to the reference points 25.

FIG. 2 brings out preferred details of a preferred form of apparatus for controlling the angular position of the cage 13 about the axis of the shaft 10. Each reference point 25 is connected through a spherical socket bearing 33 to one end of a piston rod 34 the other end of which is connected through a spherical socket bearing 35 to a piston 36. Each piston 36 is slidable in a direction essentially perpendicular to the axis 10 in a chamber 37 in the housing 38 which is attached at a fixed point to the casing 15 of the crankless motion mechanism. The outer ends 60 of the chambers 37 are interconnected by tubing 39. With the cage 13 in a given position as shown in FIG. 2 the confined region comprising the outer ends 60 of the chambers 37 and the interconnecting tubing 39 is completely filled with a substantially incompressible fluid.

Because of the hydraulic interconnection, as described, the movement of the cage 13 is restrained in such a manner that the angular displacements of the reference points 25 from their respective positions as shown in FIG. 2 is such that the algebraic sum of the angular displacements of the reference points 25 at any instant is zero. This is the case because the algebraic or net sum of the displacements of the pistons 36 must be zero in order to maintain a constant volume of the confined region (60, 39) that is completely filled with the substantially incompressible fluid.

To minimize any possible inaccuracies in the control that might be caused by seepage of fluid, the apparatus of FIG. 2 includes means for compensating for possible seepage. The inner ends 61 of the chambers 37 are interconnected by tubing 62. With the cage 13 in a given position as shown in FIG. 2 the confined region comprising the inner ends 61 of the chambers 37 and the interconnecting tubing 62 is completely filled with a substantially incompressible fluid similar to that in the outer ends 60 of the chambers 37 and the tubing 39. The hydraulic interconnection 62 to the inner ends 61 of the chambers 37 provides the same restraint on the angular displacements of the reference points 25 as does the hydraulic interconnection 39 of the outer ends 60 of the chambers 37. This is the case because the algebraic or net sum of the displacements of the pistons 36 must be zero in order to maintain a constant volume of the confined region 61, 62 that is completely filled with the substantially incompressible fluid.

Each piston 36 includes a necked down midportion 63, thereby providing an intermediate open space 64 in each chamber 37. Substantially incompressible fluid similar to that in the ends 60, 61 of the chamber 37 and in the tubing 39, 62 is supplied under pressure to the intermediate space 64 in each chamber 37, through the tubing 65.

A passage 66 is provided in each chamber 37 to communicate the intermediate space 64 with the outer end space 60 if the outer end of the piston 36 moves within a predetermined distance from the outer end of the chamber 37 such that the necked down midportion 63 of the piston 36 extends over a portion of the passage 66. This would happen only if the cage 13 were to move to a position beyond a predetermined desired limit, as might happen in the event of seepage of fluid in the system. A portion of the fluid supplied under pressure to the intermediate space 64 would enter the outer end space 60 in the chamber 37, tending to press the outer end of the piston 36 away from the outer end of the chamber 37 and thus counteract the undesirable movement of the cage 13.

A passage 67 is provided in each chamber 37 to communicate the intermediate space 64 with the inner end space 61 if the inner end of the piston 36 moves within a predetermined distance from the inner end of the chamber 37 such that the necked down midportion 63 of the piston 36 extends over a portion of the passage 67. This would happen only if the cage 13 were to move to a position beyond a predetermined desired limit, as might happen in the event of seepage of fluid in the system. A portion of the fluid supplied under pressure to the intermediate space 64 would enter the inner end space 61 in the chamber 37, tending to press the inner end of the piston 36 away from the inner end of the chamber 37 and thus counteract the undesirable movement of the cage 13.

A passage 68 in the shank 69 of the piston 36 communicates the inner end space 61 with an outlet 70 in the casing 38 if the inner end of the piston 36 moves beyond a predetermined distance from the inner end of the chamber 37, so that a portion of the fluid from the inner end space 61 can flow out of the space 61 and thus tend to move the inner end of the piston 36 toward the inner end of the chambers 37. This action aids the action of the fluid under pressure in the intermediate space 64 communicating through the passage 66 to the outer end space 60 which tends to provide movement in the same direction. The release of fluid from the inner end space 61 of the chamber 37 also tends to maintain a constant volume of fluid in the apparatus.

The front end portion 70 of each piston 36 containing the spherical socket bearing 35 is slidably held in a guide chamber 71 to aid in guiding the direction of movement of the piston 36 and avoid wear in the piston 36 and the chamber 37 that would result from radial or twisting forces on the piston 36.

To summarize, the present invention provides, in a crankless motion mechanism for conversion between reciprocating motion and rotary motion about an axis 10, by a rotative slant 14 in slidable engagement with a cage 13, apparatus for controlling the angular position of the cage 13 about the axis 10, comprising: three position restraining means; each position restraining means controlling the position of a different reference point 25 on the cage; the reference points 25 being angularly spaced at fixed locations on the cage about the axis 10 substantially at an angle between each reference point 25 and the angularly nearest other reference point 25 of 120 degrees; the position restraining means so restraining the angular displacements of the reference points 25 from their respective positions at a given position of the cage 13 that the alegbraic sum of the angular displacements from the respective positions at any instant is zero.

Each position restraining means comprises a piston 36 connected (33, 34, 35) to a reference point 25 on the cage 13, the piston 36 being slidable in a direction substantially perpendicular to the axis 10 in a chamber 37 at a fixed position in the mechanism, substantially incompressible fluid pressing against the piston 36 at one end 60 thereof in the chamber 37, means 39 interconnecting the fluid in the chambers 37 at said one end 60 of each piston 36 within a confined region 60, 39, similar substantially incompressible fluid pressing against each piston 36 at the opopsite end 61 thereof in the chambers 37, means 62 interconnecting the fluid in the chambers at said opposite end 61 of each piston 36 within a confined region 61, 62, similar substantially incompressible fluid supplied 65 under pressure to a region 64 in each chamber 37 normally between the ends of the piston 36, means 66 in each chamber 37 for communicating the last-mentioned region 64 with the one end 60 in the chamber 37 adjacent said one end of the piston 36 when said one end of the piston 36 moves within a predetermined distance from the adjacent one (outer) end of the chamber 37 to supply a portion of the fluid from the last-mentioned region 64 to the one end 60 of the chamber and thus tend to press said one end of the piston 36 away from the adjacent one end of the chamber 37, means 67 in each chamber 37 for communicating the last mentioned region 64 with the opposite end 61 in the chamber 37 adjacent said opposite end of the piston 36 when said opposite end of the piston 36 moves within a predetermined distance from the adjacent (inner) opposite end of the chamber 37 to supply a portion of the fluid from the last mentioned region 64 to the opposite end 61 of the chamber and thus tend to press said opposite end of the piston 36 away from the adjacent opposite end of the chamber 37, and means 68 in the chamber 37 for communicating said opposite end 61 with an outlet 70 therefrom when said opposite end of the piston 36 moves beyond a predetermined distance from said adjacent opposite end of the chamber 37 to permit a portion of the fluid from said opposite end 61 of the chamber to flow out of the chamber and thus tend to move said opposite end of said piston toward said adjacent opposite (inner) end of the chamber 37.

The reference characters in the above summary indicate generally the primary components shown in the drawings corresponding to the recited features, to facilitate understanding of the claims. The reference characters are used merely by way of example, however, and not in any limiting sense.

While the forms of the invention herein disclosed constitute preferred embodiments, it is not intended to describe all of the possible equivalent forms or ramifications of the invention. It will be understood that the words used are words of description rather than of limitation, and that various changes, as in shape, relative size, and arrangement of parts, may be made without departing from the spirit or scope of the invention.

What is claimed is:

1. In a crankless motion mechanism for conversion between reciprocating motion and rotary motion about an axis, by a rotative slant in slidable engagement with a cage, apparatus for controlling the angular position of said cage about said axis, comprising: three position restraining means; each said position restraining means controlling the position of a different reference point on said cage; said reference points being angularly spaced at fixed locations on said cage about said axis substantially at an angle between each reference point and the angularly nearest other reference point of 120 degrees; said position restraining means so restraining the angular displacements of said reference points from their respective positions at a given position of said cage that the algebraic sum of said angular displacements from said respective positions at any instant is zero; each said position restraining means comprising a piston connected to a said reference point on said cage, said piston being slidable in a direction substantially perpendicular to said axis in a chamber at a fixed position in said mechanism, substantially incompressible fluid pressing against said piston at one end thereof in said chamber; means interconnecting the fluid in said chambers at said one end of each said piston within a confined region, similar substantially incompressible fluid supplied under pressure to a region in each said chamber normally between the ends of said piston, and means in each said chamber for communicating said last-mentioned region with the one end in said chamber adjacent said one end of said piston when said one end of said piston moves within a predetermined distance from the adjacent one end of said chamber to supply a portion of said fluid from said last-mentioned region to said one end of said chamber and thus tend to press said one end of said piston away from said adjacent one end of said chamber.

2. In a crankless motion mechanism for conversion between reciprocating motion and rotary motion about an axis, by a rotative slant in slidable engagement with a cage, apparatus for controlling the angular position of said cage about said axis, comprising: three position restraining means; each said position restraining means controlling the position of a different reference point on said cage; said reference points being angularly spaced at fixed locations on said cage about said axis substantially at an angle between each reference point and the angularly nearest other reference point of 120 degrees; said position restraining means so restraining the angular displacements of said reference points from their respective positions at a given position of said cage that the algebraic sum of said angular displacements from said respective positions at any instant is zero; each said position restraining means comprising a piston connected to a said reference point on said cage, said piston being slidable in a direction substantially perpendicular to said axis in a chamber at a fixed position in said mechanism, substantially incompressible fluid pressing against said piston at one end thereof in said chamber, means interconnecting the fluid in said chambers at said one end of each said piston within a confined region, similar substantially incompressible fluid pressing against each said piston at the opposite end thereof in said chambers, means interconnecting the fluid in said chambers at said opposite end of each said piston within a confined region, similar substantially incompressible fluid supplied under pressure to a region in each said chamber normally between said ends of said piston, means in each said chamber for communicating said last-mentioned region with the one end in said chamber adjacent said one end of said piston when said one end of said piston moves within a predetermined distance from the adjacent one end of said chamber to supply a portion of said fluid from said last-mentioned region to said one end of said chamber and thus tend to press said one end of said piston away from said adjacent one end of said chamber, means in each said chamber for communicating said last-mentioned region with the opposite end in said chamber adjacent said opposite end of said piston when said opposite end of said piston moves within a predetermined distance from the adjacent opposite end of said chamber to supply a portion of said fluid from said last-mentioned region to said opposite end of said chamber and thus tend to press said opposite end of said piston away from said adjacent opposite end of said chamber, and means in said chamber for communicating said opposite end with an outlet therefrom when said opposite end of said piston moves beyond a predetermined distance from said adjacent opposite end of said chamber to permit a portion of said fluid from said opposite end of said chamber to flow out of said chamber and thus tend to move said opposite end of said piston toward said adjacent opposite end of said chamber.

References Cited in the file of this patent

UNITED STATES PATENTS

| | | |
|---|---|---|
| 2,105,019 | Turner | Jan. 11, 1938 |
| 2,326,912 | Allison | Aug. 17, 1943 |
| 2,917,931 | Sherman | Dec. 22, 1959 |

FOREIGN PATENTS

| | | |
|---|---|---|
| 1,132,634 | France | Nov. 5, 1956 |